(12) United States Patent
Fraley

(10) Patent No.: US 8,220,868 B2
(45) Date of Patent: Jul. 17, 2012

(54) RETRACTABLE PANEL ASSEMBLIES AND MOTOR VEHICLES INCORPORATING THE SAME

(75) Inventor: Josh David Fraley, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/967,689

(22) Filed: Dec. 14, 2010

(65) Prior Publication Data
US 2012/0146362 A1 Jun. 14, 2012

(51) Int. Cl.
*B60J 7/22* (2006.01)
(52) U.S. Cl. ................ 296/217; 160/84.04; 160/84.07
(58) Field of Classification Search ............... 296/217, 296/136.03, 100.16, 214; 160/84.01, 84.04, 160/382, 404, 84.07
See application file for complete search history.

(56) References Cited

U.S. PATENT DOCUMENTS

| | | | |
|---|---|---|---|
| 4,702,518 A | 10/1987 | Paerisch et al. | |
| 4,872,722 A | 10/1989 | Farmont | |
| 4,966,409 A | 10/1990 | Schmidhuber et al. | |
| 5,066,068 A | 11/1991 | Suzuki et al. | |
| 5,484,184 A | 1/1996 | Kohlpaintner et al. | |
| 6,030,031 A | 2/2000 | Martinus Lenkens | |
| 6,457,769 B2 | 10/2002 | Hertel et al. | |
| 6,779,837 B1 | 8/2004 | Cooney et al. | |
| 6,923,500 B2 | 8/2005 | Ito | |
| 7,048,329 B2 | 5/2006 | Heyn | |
| 7,121,618 B2 | 10/2006 | Uehara et al. | |
| 7,255,392 B2 | 8/2007 | Bendel et al. | |
| 7,775,250 B2 | 8/2010 | Filipiak et al. | |
| 7,862,109 B2 * | 1/2011 | Geerets | 296/217 |
| 2001/0019217 A1 | 9/2001 | Hertel et al. | |
| 2010/0164252 A1 | 7/2010 | Farber et al. | |

OTHER PUBLICATIONS

Photograph and illustrations of prior design garnish and holder, disclosed before Dec. 14, 2009.

\* cited by examiner

*Primary Examiner* — Dennis Pedder
(74) *Attorney, Agent, or Firm* — Dinsmore & Shohl LLP (57) ABSTRACT

A retractable panel assembly includes a cover panel slidingly engaged with a rail assembly and having an open position and a closed position, where the cover panel translates along the rail assembly as the cover panel translates between open and closed positions. The retractable panel assembly further includes a shade located between the rail assembly and the cover panel, the shade having an engagement member, and a retention assembly having a retention member engaged with the engagement member of the shade, where, when the cover panel translates between open and closed positions, the retention member works in conjunction with the engagement member of the shade to prevent the shade from translating and the retention assembly retrains at least a second portion of the shade in a vertical direction.

17 Claims, 5 Drawing Sheets

RETRACTABLE PANEL ASSEMBLIES AND MOTOR VEHICLES INCORPORATING THE SAME

TECHNICAL FIELD

The present specification generally relates to retractable panel assemblies and, more specifically, to devices for retaining shades or blinds of retractable roof panels for motor vehicles.

BACKGROUND

Some motor vehicles with retractable panels installed in the roof have one or more shades that cover the mechanisms that retract the cover panel. Such a shade may be compliant to accommodate translation and rotation of the retractable panel.

Previous shades have been attached to the retractable panel and the surrounding motor vehicle structure by gripping interfaces. These interfaces allow for easy installation, but are prone to relaxation of the gripping interfaces, which may lead to detachment of the shade from the surrounding motor vehicle structure, particularly when the retractable panel is retracted. Detachment of the shade may interfere with movement of the retractable panel and may render the panel inoperable. Accordingly, a need exists for retractable panel assemblies that have improved shade retention features.

SUMMARY

In one embodiment, a retractable panel assembly includes a cover panel slidingly engaged with a rail assembly and having an open position and a closed position, where the cover panel translates along the rail assembly as the cover panel translates between open and closed positions. The retractable panel assembly further includes a shade located between the rail assembly and the cover panel, the shade having an engagement member, and a retention assembly having a retention member engaged with the engagement member of the shade, where, when the cover panel translates between open and closed positions, the retention member works in conjunction with the engagement member of the shade to prevent the shade from translating and the retention assembly retrains at least a second portion of the shade in a vertical direction.

In another embodiment, a motor vehicle includes a roof with an opening, a rail assembly coupled to the motor vehicle and positioned in the opening, and a cover panel slidingly engaged with the rail assembly such that the cover panel translates along the rail assembly as the cover panel moves between open and closed positions. The motor vehicle further includes a shade coupled between the rail assembly and the cover panel, the shade having an engagement member, and a retention assembly positioned adjacent to the rail assembly, the retention assembly having a retention member engaged with the engagement member of the shade, such that, when the cover panel translates between open and closed positions, the retention member works in conjunction with the engagement member of the shade to prevent the shade from translating relative to the rail assembly.

In yet another embodiment, a retractable panel assembly includes a cover panel pivotally engaged with a rail assembly such that the cover panel rotates with respect to the rail assembly as the cover panel moves between inclined and closed positions, and a shade coupled to the rail assembly and the cover panel, the shade comprising an accordion panel with an engagement member formed in the accordion panel. The retractable panel assembly further includes a retention assembly having a retention member engaged with the engagement member of the accordion panel, where, when the cover panel translates to an open position, the retention member works in conjunction with the engagement member to prevent the shade from translating in an aft direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
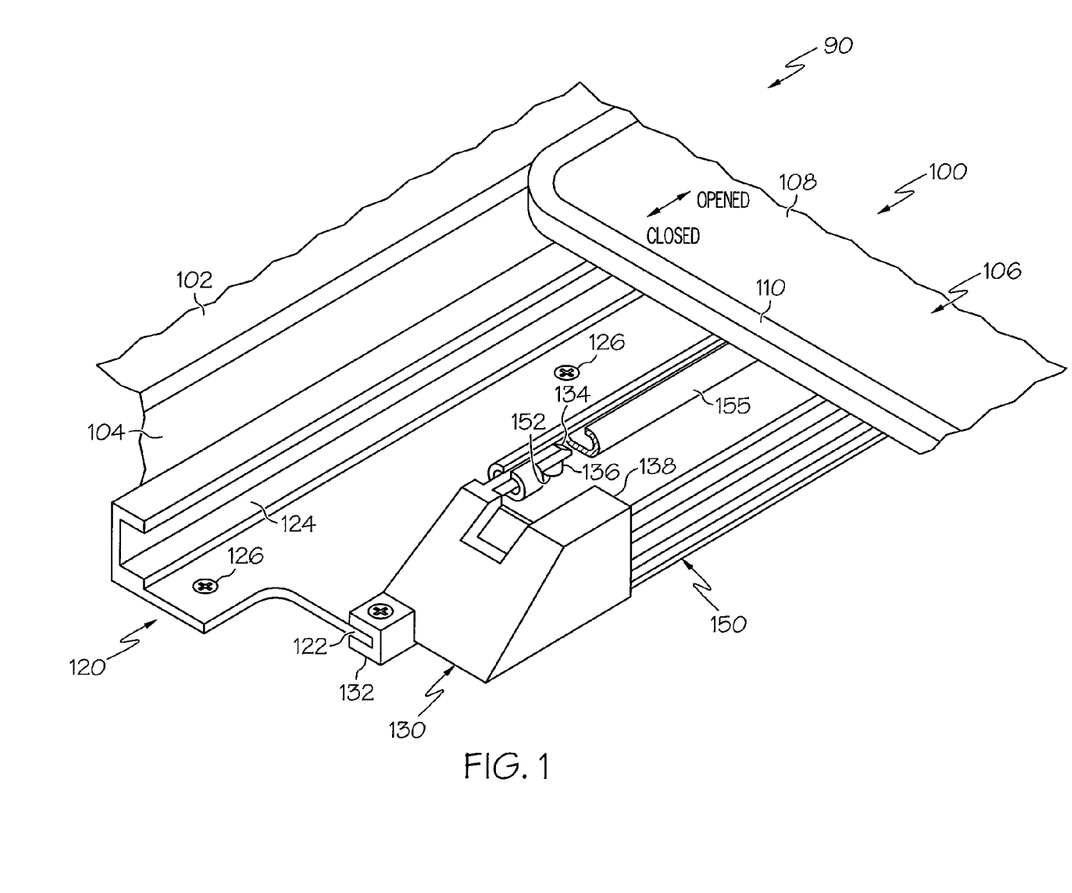
FIG. 1 depicts a schematic representation of a portion of a retractable panel assembly for a motor vehicle according to one or more embodiments shown and described herein.

FIG. 1 generally depicts one embodiment of a retractable panel assembly for a motor vehicle. The retractable panel assembly generally includes a rail assembly, a cover panel that is slidably engaged with the rail assembly such that the cover panel translates along the rail assembly, and a shade. The shade is statically engaged with the rail assembly and slidingly engaged with the cover panel. The shade is also held in position on the rail by a retention assembly that is positioned at a forward end of the rail assembly. It has been found that the shade may translate along the length of the rail assembly as the retractable panel assembly translates along the rail, thereby disengaging the shade from the rail assembly. To prevent the shade from translating along the rail, the retention assemblies described herein include a retention member, such as a barb. The retention member engages with an engagement member of the shade and prevents the shade from translating as the cover panel translates forward and aft along the rail assembly. Retention assemblies and retractable panels incorporating retention assemblies will be described in more detail herein.

Referring to FIG. 1 in detail, the retractable panel assembly 100 is mounted in an opening 104 in the roof 102 of a motor vehicle 90. The retractable panel assembly 100 includes a cover panel 106 and a rail assembly 120. The cover panel 106 is slidably engaged with the rail assembly 120 such that the cover panel 106 can be actuated to translate between an open position and a closed position. The rail assembly 120 is affixed to the motor vehicle within the opening 104 with a plurality of fasteners 126. The rail assembly 120 includes a track 124 that is parallel to the direction of translation of the cover panel 106. The cover panel 106 includes a front shoe and a rear shoe (not shown) that are attached to the cover panel 106, which facilitate translating the cover panel 106 with respect to the rail, as is conventionally known. The shoes may be inserted into the track 124 on the rail assembly 120. As the cover panel 106 translates in a first direction towards an "open" position and in a second direction towards a "closed" position, the shoes slide along the track 124, maintaining the orientation of the cover panel 106 relative to the opening 104 of the roof 102. An additional rail and front and rear shoes may be disposed on the opposing side of the cover panel 106 to provide support for the cover panel 106 on parallel sides.

The front shoes rotate within the track 124 such that the cover panel 106 is pivotally engaged with the rail assembly 120. The rear shoes may be attached to a lifting mechanism (not shown) that is positioned between the rear shoes and the cover panel 106. When the cover panel 106 is rotated from a closed position to an inclined position, the lifting mechanism expands, thereby rotating the cover panel 106 in a first rotational direction. Conversely, when the cover panel 106 is selected to rotate from an inclined position to a closed position, the lifting mechanism collapses, thereby rotating the cover panel 106 in a second rotational direction.

Figure 3:
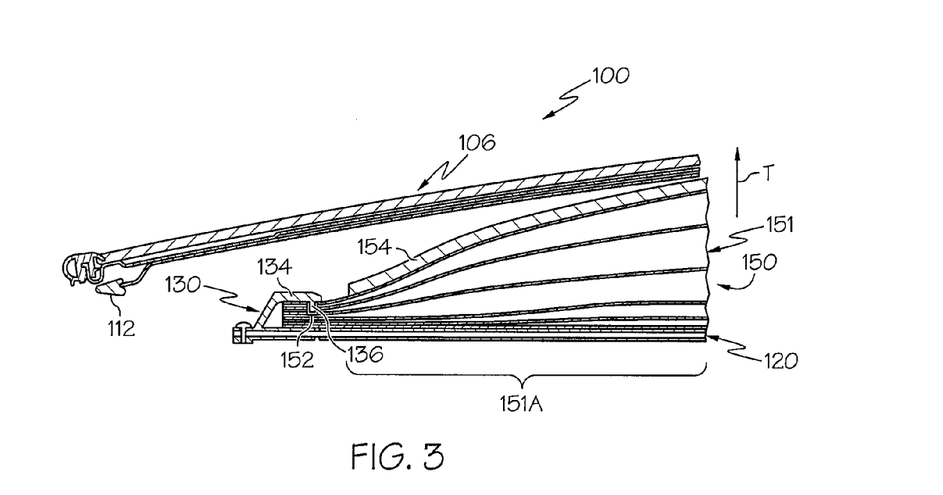
FIG. 3 depicts a schematic representation of a partial cross section of a retractable panel assembly for a motor vehicle showing the panel in an inclined position according to one or more embodiments shown and described herein.
Figure 8:
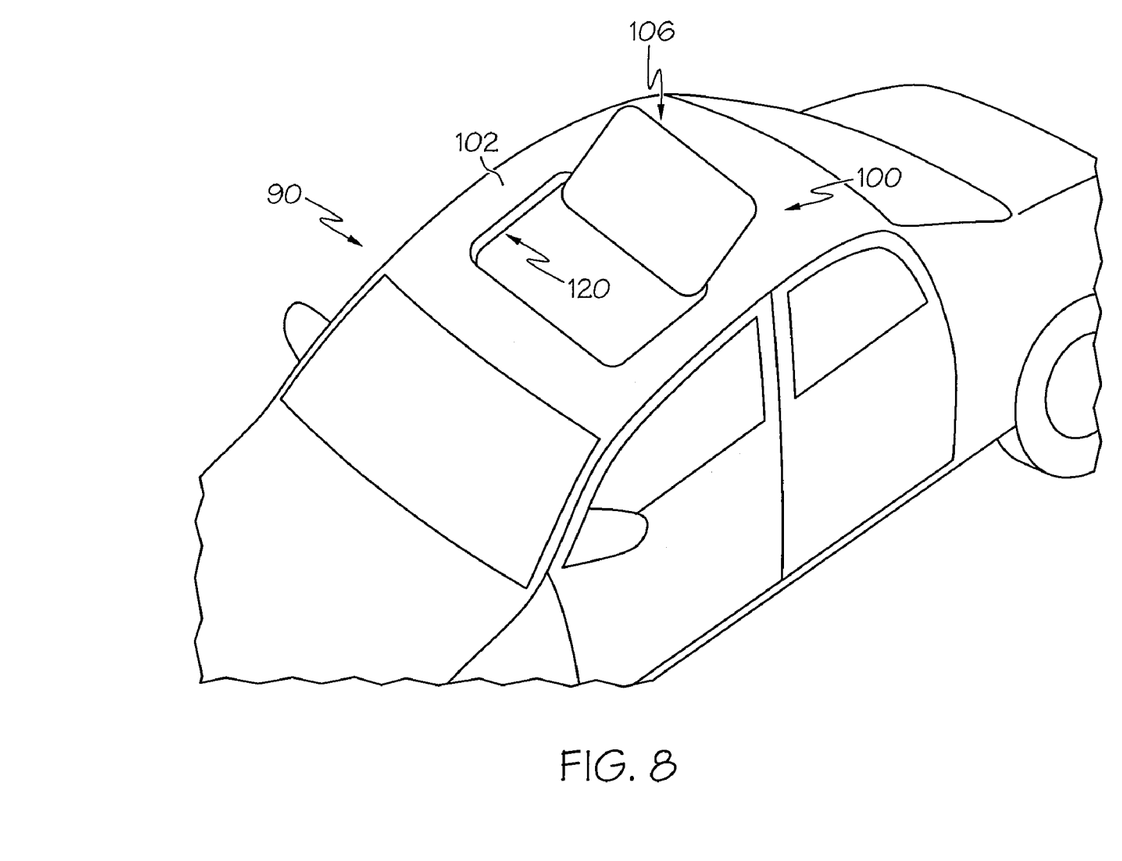
FIG. 8 is a schematic representation of a motor vehicle having a retractable panel assembly according one or more embodiments shown and described herein.

The cover panel 106 may be attached to a drive motor (not shown) as is conventionally known. The drive motor applies force to the cover panel 106 to translate the cover panel 106 between the open and closed positions. Additionally, before the cover panel 106 is translated to an open position, the cover panel 106 is rotated in a first rotational direction to an inclined position as depicted in FIG. 3. Rotating the cover panel 106 to an inclined position prior to translating the cover panel 106 from a closed position to an open position permits the cover panel 106 to be positioned over the roof 102 of the motor vehicle 90 as the cover panel 106 moves to an open position, as depicted in FIG. 8.

Still referring to FIG. 1, the cover panel 106 includes a cover plate 108 and a cover seal 110. The cover plate 108 may be made from a variety of materials including, for example, glass, plastic, metal, fiber glass, carbon fiber, and/or combinations thereof. The cover seal 110 is formed from a compliant and resilient member that deforms to form a water-tight seal between the opening 104 of the roof 102 and the cover plate 108 when the cover panel 106 is positioned in a closed position.

The lifting mechanism and the drive motor are electronically connected to a control switch. The control switch allows a passenger in the motor vehicle 90 to selectively translate the cover panel 106 between the open and the closed positions and/or between the inclined and the closed positions. Additionally, logic may be provided such that when the cover panel 106 is translated to an open position from a closed position, the cover panel 106 is rotated in a first rotational direction to incline the cover panel 106 with respect to the roof 102, then translated to an open position.

To shield the track 124, the front and rear shoes, and other assembly hardware from view from within the passenger cabin of the motor vehicle 90, a shade 150 is employed. The shade 150 is attached to both the cover panel 106 and the opening 104 through attachment to the rail assembly 120. The shade 150 is also inserted into and retained by a retention assembly 130, which is attached to the rail assembly 120 with a mounting bracket 132.

Figure 2:
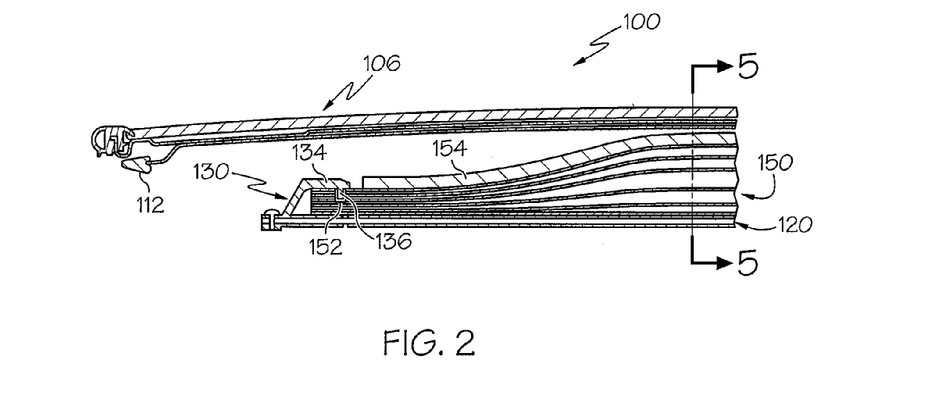
FIG. 2 depicts a schematic representation of a partial cross-section of a retractable panel assembly for a motor vehicle showing the panel in a closed position according to one or more embodiments shown and described herein.
Figure 4:
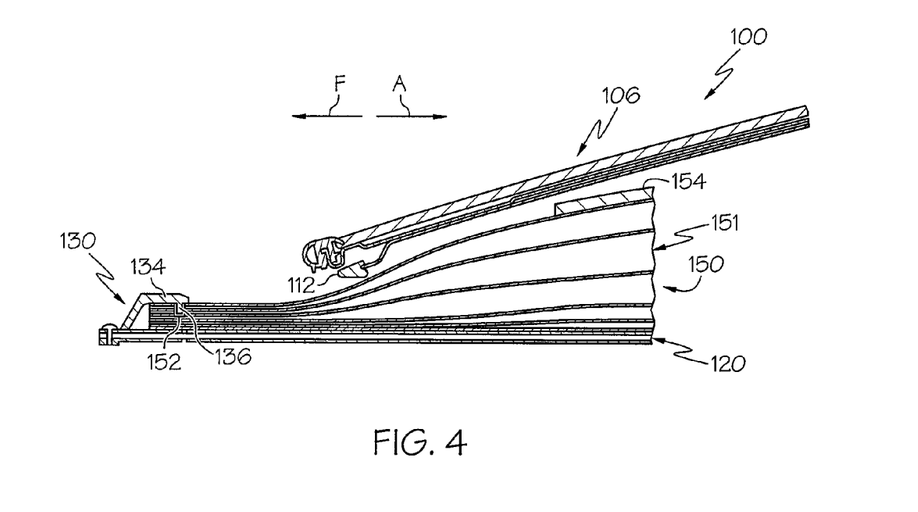
FIG. 4 depicts a schematic representation of a partial cross section of a retractable panel assembly for a motor vehicle showing the panel in an open position according to one or more embodiments shown and described herein.

Referring now to FIGS. 2-4, the cover panel 106 moves between a closed position, as depicted in FIG. 2, and an open position, as depicted in FIG. 4. When the cover panel 106 moves from a closed position to an open position, the cover panel 106 is first tilted into an inclined position, as depicted in FIG. 3, by rotating the cover panel 106 in a first direction, as indicated by arrow "T." Once in this inclined position, the cover panel 106 translates to an open position, as depicted in FIG. 4, by translating the cover panel 106 aft in the direction of arrow "A" (i.e., in a first direction). Conversely, when the cover panel 106 moves from an open position to a closed position, the cover panel 106 is first translated forward in the direction of arrow "F" (i.e., in a second direction). The cover panel 106 is rotated in a downward direction until the cover panel 106 is positioned in a closed position, as depicted in FIG. 2.

Figure 5:
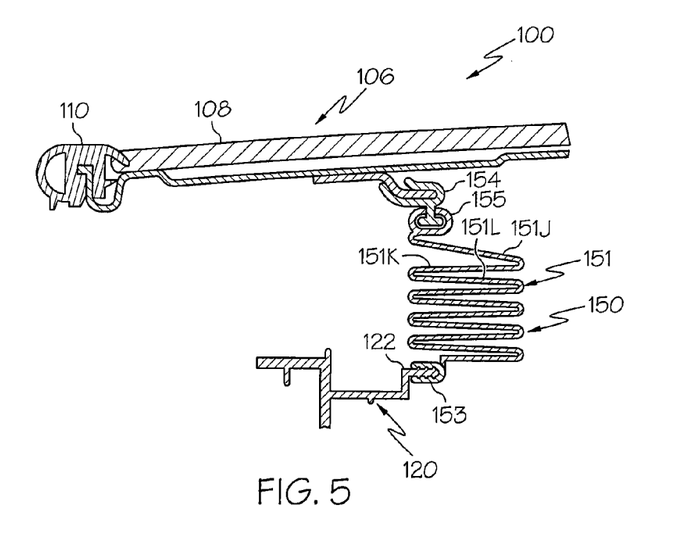
FIG. 5 depicts a partial cross sectional view of the retractable panel assembly for a motor vehicle according to FIG. 2.

In one embodiment depicted in FIG. 5, the shade 150 includes an accordion panel 151 that is comprised of a plurality of individual layers 151J, 151K, 151L that are stacked on top of one another when the accordion panel 151 is collapsed. The shade 150 also includes a lower garnish channel 153 and an accordion channel 155. The upper garnish 154 is a resilient and compliant member that is attached to the cover panel 106 and is slidingly engaged with the accordion panel 151 through the accordion channel 155. The lower garnish channel 153 is a resilient and compliant member that engages with the lower platform 122 of the rail assembly 120 such that the accordion panel 151 can be expanded when the cover panel 106 is inclined. The lower garnish channel 153 may also provide some resistance from the forces associated with translation of the cover panel 106. However, the resistance provided by the lower garnish channel 153 may not be sufficient to overcome all of the force associated with the translation of the cover panel 106, and, therefore, the lower garnish channel 153, by itself, is unable to maintain the fore-aft position of the accordion panel 151 with respect to the rail assembly 120.

Figure 6:
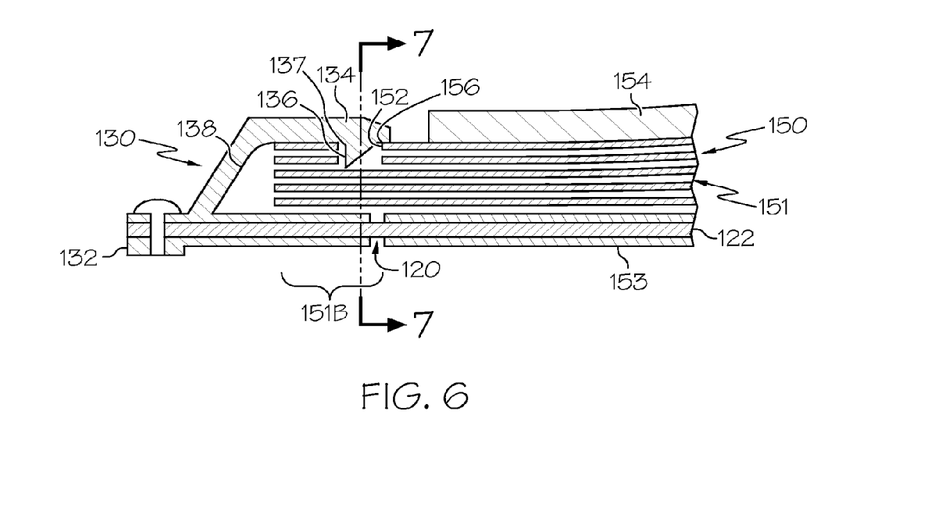
FIG. 6 depicts a cross sectional view of a schematic representation of a retractable panel assembly for a motor vehicle according to one or more embodiments shown and described herein.
Figure 7:
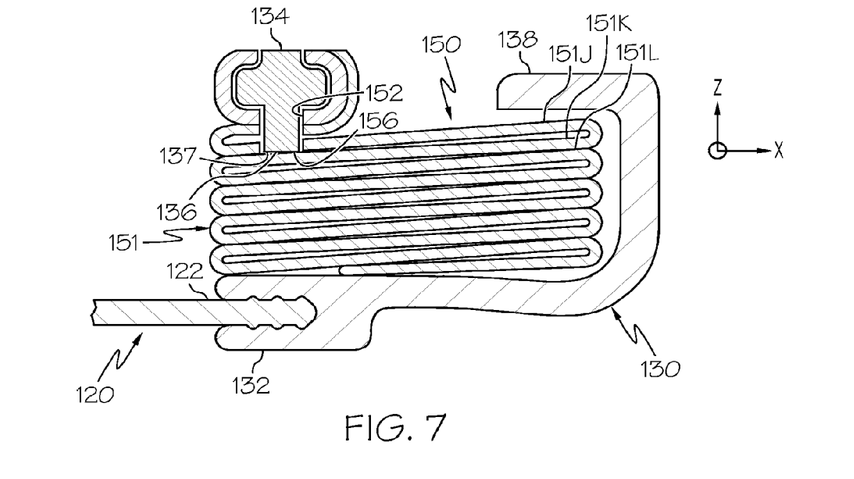
FIG. 7 depicts a cross sectional view of a retractable panel assembly for a motor vehicle according to FIG. 6.

As depicted in FIGS. 6 and 7, the forward end of shade 150 is retained within a retention assembly 130 that maintains the forward-aft position of the accordion panel 151 throughout the range of motion of the cover panel 106. The retention assembly 130 is attached along the lower platform 122 of the rail assembly 120 at the forward end of the rail assembly 120. The retention assembly 130 includes a receptacle 138 for receiving a forward end of the shade 150. A portion of the shade 150 (i.e., a second portion 151B of the accordion panel 151) is inserted into the receptacle 138 such that the receptacle 138 at least partially surrounds the second portion 151B of the accordion panel 151. Throughout the translation and the rotation of the cover panel 106, the second portion 151B of the accordion panel 151 remains in a collapsed position inside the receptacle 138 of the retention assembly 130. Accordingly, it should be understood that the second portion 151B of the accordion panel 151 is restrained in a vertical direction (i.e., in the vertical direction Z) when positioned in the receptacle 138 of the retention assembly 130. By at least partially surrounding the shade 150 (including the accordion panel 151), the retention assembly 130 assists in controlling the movement of the accordion panel 151 as it expands and collapses to accommodate tilting of the cover panel 106. Because the accordion panel 151 is compliant, it may otherwise have a tendency to disengage from the retention assembly 130 and project into the passenger cabin of the motor vehicle.

The retention assembly 130 includes a retention member 136 that engages with an engagement member 152 formed in the shade 150. The retention member 136 may take a variety of forms, including, for example, a barb 137 that projects from a finger 134, as depicted in FIGS. 6 and 7. Similarly, the engagement member 152 make take a variety of forms, including, for example, an aperture 156 in the shade 150. The aperture 156 passes through the top-most layer of the accordion panel 151 when the accordion panel 151 is folded or compressed, forming an engagement member 152 that the retention member 136 engages with.

In one embodiment, the aperture 156 in the shade 150 may be formed by stamping a hole into at least one layer 151J, 151K, 151L of the accordion panel 151. Holes may be formed in additional layers 151J, 151K, 151L of the accordion panel 151 such that when the accordion panel 151 is collapsed and the layers 151J, 151K, 151L are folded onto one another, the holes are aligned to create the aperture 156 that extends through multiple layers of the accordion panel 151. The barb 137 extends a corresponding distance from the bottom of the finger 134 into the receptacle 138 such that the barb 137 extends through multiple layers 151J, 151K, 151L of the accordion panel 151 that make up the aperture 156. In one embodiment, the aperture 156 may be reinforced to prevent tear-out of the accordion panel 151 from an application of force by the barb 137. Examples of such reinforcement include a grommet that is affixed to the portion of the accordion panel 151 that surrounds the aperture 156. The grommet may be made from the same material from which the accordion panel 151 is made. The grommet may also be made from a material that is more resilient to the loading condition between the barb 137 and the shade 150.

The retention member 136 is shaped such that the shade 150 can be installed into the retention assembly 130 using a nominal amount of force. For example, the insertion force of the shade 150 into the retention assembly 130 may be less than about 30 Newtons. The retention member 136 may be shaped to allow the shade 150 to be easily inserted, but resist movement in the direction opposite of shade 150 insertion, which generally corresponds with a force applied to the shade 150 by the cover panel 106 translating from a closed position to an open position. When the shade 150 is inserted into the retention assembly 130, the accordion panel 151 is positioned such that the barb 137 is received into the aperture 156. When the shade 150 is attached to both the rail assembly 120 and the cover panel 106, and the cover panel 106 is translated from a closed position to an open position, the barb 137 contacts the aperture 156 in the accordion panel 151. The retention member 136 applies a force to the shade 150 that counteracts any force applied to the shade 150 by the cap 112 of the cover panel 106 as will be described in more detail herein. Thus, the retention member 136 prevents the accordion panel 151 from being pulled out of the receptacle 138 by the translation of the cover panel 106. In one embodiment, the cap 112 applies a force up to about 5 Newtons to the shade 150. The retention member 136 resists this force by working in conjunction with the engagement member 152 such that the shade 150 is prevented from translating and the shade 150 is not pulled out of the receptacle 138. The retention member 136, therefore, prevents translation of the accordion panel 151 in the aft direction and keeps the lower garnish channel 153 engaged with the lower platform 122 of the rail assembly 120.

More specifically, referring again to FIGS. 2-4, when the cover panel 106 is tilted into an inclined position, the upper garnish 154 rotates with the cover panel 106, and draws the adjoining portion of the shade 150 (i.e., a first portion 151A of the accordion panel 151) with it. With this movement of the cover panel 106, the first portion 151A of the accordion panel 151 expands, or unfurls, such that the accordion panel 151 spans the gap between the cover panel 106 and the rail assembly 120. As shown in FIGS. 2 and 4, when the cover panel 106 is translated forward or aft, the upper garnish 154 translates with the cover panel 106 and slides along the accordion panel 151 in the accordion channel 155 (not shown in these views) while the accordion panel 151 remains in a fixed forward-aft position on the rail assembly 120. As the cover panel 106 translates from a closed position to an open position, a cap 112 of the cover panel 106 contacts a portion of the shade 150. The contact between the cap 112 and the shade 150 applies a force to the accordion panel 151 in the direction of translation of the cover panel 106.

As shown in FIG. 4, when the cover panel 106 is translated from a forward position to an aft position, the cap 112 of the cover panel 106 contacts the accordion panel 151 and applies a drag force in a direction corresponding to the direction of travel of the cover panel 106. However, the retention assembly 130 and the engagement member 152 prevent the lower garnish channel 153 and the accordion panel 151 from translating relative to the rail assembly 120. Because the barb 137 of the retention assembly 130 extends through the aperture 156 of the engagement member 152, any force applied to the accordion panel 151 by the cover panel 106 is counteracted by engagement of the barb 137 with the layers 151J, 151K, 151L of the accordion panel 151. Thus, the retention member 136 and the engagement member 152 work in conjunction with one another to prevent translation of the shade 150 when a force is applied by the cover panel 106.

Because the retention member 136 prevents the shade 150 from traversing in an aft direction away from the retention assembly 130, the second portion 151B of the shade 150 that is held inside the receptacle 138 remains fixed within the receptacle 138 throughout the range of motion of the cover panel 106. The retention assembly 130, therefore, prevents the second portion 151B of the shade 150 from expanding or collapsing. By constraining the second portion 151B of the shade 150, the retention assembly 130 acts as a guide for the shade 150 and ensures that the accordion panel 151 unfurls and collapses properly and does not protrude into the passenger cabin of the motor vehicle 90 to which the retractable panel assembly 100 is attached.

The retention assembly 130 restrains the shade 150 at ambient temperatures that are elevated above room temperature. For example, the retention assembly 130 prevents the shade 150 from translating at temperatures greater than about 90° C. from a force applied by the cover panel 106 to the shade 150. Because the retention assembly 130 and the shade 150, and various subcomponents of the retention assembly 130 and the shade 150, may be made from a variety of different materials, the retention assembly 130 and the shade 150 are designed to accommodate differing rates of expansion due to the change in ambient temperature. For example, in one embodiment, the retention assembly 130 is made from a polymeric material, such as Polyphenylene oxide (PPO) or nylon. The shade 150, including the accordion panel 151, the lower garnish channel 153, and the accordion channel 155, along with the upper garnish 154, are made from ethylene propylene diene monomer (EPDM). The rail assembly 120 is made from a metal, for example, steel or aluminum. Because the coefficients of thermal expansion of PPO, nylon, and EPDM are greater than the coefficient of thermal expansion of either steel or aluminum, the fit between the lower garnish channel 153 and the lower platform 122 of the rail assembly 120, for example, is looser at an increased temperature than if the components were installed at room temperature.

As depicted in FIG. 8, one embodiment of the retractable panel assembly 100 is depicted in which the cover panel 106 is positioned over the roof 102 of the vehicle 90 when the retractable panel assembly 100 is in the open position. However, other suitable embodiments are contemplated. For example, other vehicles, such as boats or buses, may include similar retractable panels. Additionally, buildings may have windows that tilt and/or slide relative to the window frame. It may be desirable to shroud the hardware associated with these movements away from the view of an occupant of the building, and so the windows may include shade features as described herein.

In another embodiment (not shown), when moving from a closed position to an open position, the lifting mechanism first contracts such that the cover panel is tilted downward towards the passenger compartment and into a declined position. With the cover panel in this declined position, the cover panel has increased clearance from the roof. Once in the declined position, the cover panel is translated aft to an open position. Because the cover panel is tilted into the declined position, the cover panel may tend to compress the accordion panel, which may lead to an increased drag force in the aft direction. In this embodiment, the retention member works in conjunction with the engagement member to counteract this drag force and prevent translation of the shade.

It should now be understood that a retractable panel assembly for a motor vehicle described herein prevents the translation of the shade when the cover panel to which the shade is attached translates forward and aft. Specifically, the retractable panel assembly includes a retention assembly having a retention member that is engaged with an engagement member of the shade. The retention panel works in conjunction with the engagement member to prevent the shade from translating when the cover panel applies a force to the shade as the shade translates.

In should also be understood that, in some embodiments, the shade may include an accordion panel that has a hole that passes through at least one of a plurality of layers that are collapsed and stacked on top of one another. The hole through the plurality of layers forms the engagement member. The retention member may be a barb located on a finger. When the barb is engaged with the hole through the shade, the barb and the hole work in conjunction with one another to prevent the shade from translating when the cover panel applies a force to the shade.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A retractable panel assembly comprising:

a cover panel slidingly engaged with a rail assembly and having an open position and a closed position, wherein the cover panel translates along the rail assembly as the cover panel translates between open and closed positions;

a shade located between the rail assembly and the cover panel, the shade comprising an accordion panel having a plurality of layers of compliant material and a hole passing through a plurality of said layers, wherein, when the plurality of layers are folded onto one another, the hole in the plurality of layers forms an engagement member; and a retention assembly having a retention member engaged with the plurality of said layers of the shade, wherein, when the cover panel translates between the open and closed positions, the retention member works in conjunction with the engagement member of the shade to prevent the shade from translating and the retention assembly restrains at least a second portion of the shade in a vertical direction.

2. The retractable panel assembly of claim 1, wherein the shade comprises an accordion panel and the engagement member is formed in the accordion panel.

3. The retractable panel assembly of claim 1, wherein a portion of the shade is positioned in the retention assembly.

4. The retractable panel assembly of claim 1, wherein the shade further comprises a lower garnish channel and an accordion channel coupled to the accordion panel, wherein the lower garnish channel is engaged with the rail assembly and the accordion channel is slidingly engaged with an upper garnish coupled to the cover panel.

5. The retractable panel assembly of claim 1, wherein the retention member comprises a barb positioned on a finger of the retention member.

6. The retractable panel assembly of claim 5, wherein, when the cover panel translates between the open and the closed position, the cover panel applies a force to the accordion panel in a direction of travel of the cover panel.

7. The retractable panel assembly of claim 1, wherein the cover panel comprises a cap arranged between a cover plate and the shade, the cap contacting the shade as the cover panel translates to the open position.

8. The retractable panel assembly of claim 1, wherein the retention member prevents translation of the shade in an aft direction when a force of up to at least about 5 Newtons is applied to the shade in the aft direction.

9. The retractable panel assembly of claim 8, wherein the retention member prevents the shade from translating at temperatures greater than about 90° C.

10. The retractable panel assembly of claim 1, wherein a first portion of the shade is positioned outside of the retention assembly and the second portion of the shade is positioned inside the retention assembly.

11. The retractable panel assembly of claim 10, wherein the cover panel is pivotally engaged with the rail assembly such that the cover panel rotates relative to the rail assembly between closed and inclined positions, and, when the cover panel rotates from the closed position to an inclined position, the first portion of the shade expands and the second portion of the shade remains in a collapsed position.

12. A motor vehicle comprising:
a roof with an opening;
a rail assembly coupled to the motor vehicle and positioned in the opening;
a cover panel slidingly engaged with the rail assembly such that the cover panel translates along the rail assembly as the cover panel moves between open and closed positions;
a shade coupled between the rail assembly and the cover panel, the shade having an accordion panel having a plurality of layers of compliant material and a hole passing through a plurality of said layers, wherein, when the plurality of layers are folded onto one another, the hole in the plurality of layers forms an engagement member; and
a retention assembly positioned adjacent to the rail assembly, the retention assembly having a retention member engaged with the plurality of said layers of the shade, such that, when the cover panel translates between open and closed positions, the retention member works in conjunction with the engagement member of the shade to prevent the shade from translating relative to the rail assembly.

13. The motor vehicle of claim 12, wherein the retention member comprises a barb positioned on a finger of the retention assembly.

14. The motor vehicle of claim 12, wherein the shade further comprises an upper garnish coupled to the cover panel and a lower garnish channel coupled to the rail assembly.

15. The motor vehicle of claim 12, wherein the retention member prevents translation of the shade in an aft direction when a force of up to at least about 5 Newtons is applied to the shade in the aft direction.

16. A retractable panel assembly comprising:
a cover panel slidingly and pivotally engaged with a rail assembly such that the cover panel rotates with respect to the rail assembly as the cover panel moves between inclined and closed positions and the cover panel translates along the rail assembly as the cover panel translates between open and closed positions;
a shade coupled to the rail assembly and the cover panel, the shade comprising an accordion panel having a plurality of layers of compliant material and a hole passing through a plurality of said layers wherein, when the plurality of layers are folded onto one another, the hole in the plurality of layers forms an engagement member formed in the accordion panel; and
a retention assembly having a retention member engaged with the plurality of said layers of the accordion panel, the retention member comprising a barb positioned on a finger of the retention member,
wherein when the cover panel translates to an open position, the retention member works in conjunction with the engagement member to prevent the shade from translating in an aft direction.

17. The retractable panel assembly of claim 16, wherein a first portion of the shade is positioned outside of the retention assembly and a second portion of the shade is positioned inside the retention assembly, and when the cover panel rotates between inclined and closed positions, the first portion of the shade expands and the second portion of the shade remains in a collapsed position.

* * * * *